(12) United States Patent
Waltner

(10) Patent No.: US 10,112,697 B2
(45) Date of Patent: Oct. 30, 2018

(54) AIRCRAFT WITH THRUST VECTORING TAIL

(71) Applicant: Sikorsky Aircraft Corporation, Stratford, CT (US)

(72) Inventor: Peter James Waltner, Royal Palm Beach, FL (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 252 days.

(21) Appl. No.: 15/151,269

(22) Filed: May 10, 2016

(65) Prior Publication Data

US 2016/0332727 A1    Nov. 17, 2016

Related U.S. Application Data

(60) Provisional application No. 62/159,635, filed on May 11, 2015.

(51) Int. Cl.
*B64C 27/82* (2006.01)
*B64C 3/42* (2006.01)

(52) U.S. Cl.
CPC ............. *B64C 3/42* (2013.01); *B64C 27/82* (2013.01); *B64C 2027/8218* (2013.01)

(58) Field of Classification Search
CPC .......... B64C 3/42; B64C 3/385; B64C 27/82; B64C 2027/8218; B64C 2027/8227; B64C 2027/8236; B64C 2027/8263; B64C 2027/8272
See application file for complete search history.

(56) References Cited

U.S. PATENT DOCUMENTS

| | | | | |
|---|---|---|---|---|
| 3,155,341 A * | 11/1964 | Girard | ..................... | B64C 27/26 244/17.19 |
| 3,241,791 A * | 3/1966 | Piasecki | ................. | B64C 27/82 244/17.19 |
| 3,332,643 A * | 7/1967 | Toner | ..................... | B64C 27/32 244/17.21 |
| 3,884,431 A * | 5/1975 | Burrell | ................... | B64C 27/24 244/12.3 |
| 7,275,711 B1* | 10/2007 | Flanigan | ................ | B64C 27/18 244/17.11 |
| 8,336,808 B2 | 12/2012 | Challis | | |
| 8,424,798 B2* | 4/2013 | Challis | ................... | B64C 27/26 244/17.11 |
| 8,807,476 B2* | 8/2014 | Raffel | ...................... | B64C 5/10 244/17.11 |
| 9,194,285 B2* | 11/2015 | Botti | ...................... | B64D 27/24 |
| 9,365,289 B2* | 6/2016 | Prud'Homme-Lacroix | ............... | B64C 27/52 |
| 2006/0157614 A1* | 7/2006 | Simpson | ................ | B64C 3/385 244/6 |

(Continued)

FOREIGN PATENT DOCUMENTS

JP    H10181694 A    7/1998

*Primary Examiner* — Richard G Davis
(74) *Attorney, Agent, or Firm* — Cantor Colburn LLP

(57) ABSTRACT

An aircraft is provided and includes an airframe having an upper section and a tail section, a main rotor assembly operably disposed at the upper section and one or more tail rotor assemblies operably disposed at the tail section. The one or more tail rotor assemblies respectively include one or more articulated propellers with thrust vectoring capability that are each independently rotatable about a respective variable rotational axis.

9 Claims, 5 Drawing Sheets

(56) References Cited

U.S. PATENT DOCUMENTS

| | | | | |
|---|---|---|---|---|
| 2008/0093500 A1* | 4/2008 | Smith | ............... | B64C 27/82 |
| | | | | 244/17.19 |
| 2008/0237392 A1* | 10/2008 | Piasecki | ............ | B64C 27/26 |
| | | | | 244/6 |
| 2008/0272244 A1* | 11/2008 | Bjornenak | .......... | B64C 3/385 |
| | | | | 244/7 R |
| 2010/0127114 A1* | 5/2010 | Nakayama | .......... | B64C 27/12 |
| | | | | 244/17.21 |
| 2011/0036954 A1* | 2/2011 | Piasecki | ............ | B64C 3/385 |
| | | | | 244/7 A |
| 2012/0012693 A1* | 1/2012 | Thomassey | ......... | B64C 27/82 |
| | | | | 244/17.21 |
| 2012/0160954 A1* | 6/2012 | Thomassey | ......... | B64C 27/82 |
| | | | | 244/17.13 |
| 2015/0210378 A1* | 7/2015 | Embacher | ............ | B64C 5/16 |
| | | | | 244/17.11 |
| 2016/0280369 A1* | 9/2016 | Pounds | ............. | A63H 27/00 |
| 2016/0332719 A1* | 11/2016 | Maltinti | ............... | B64C 1/30 |

* cited by examiner

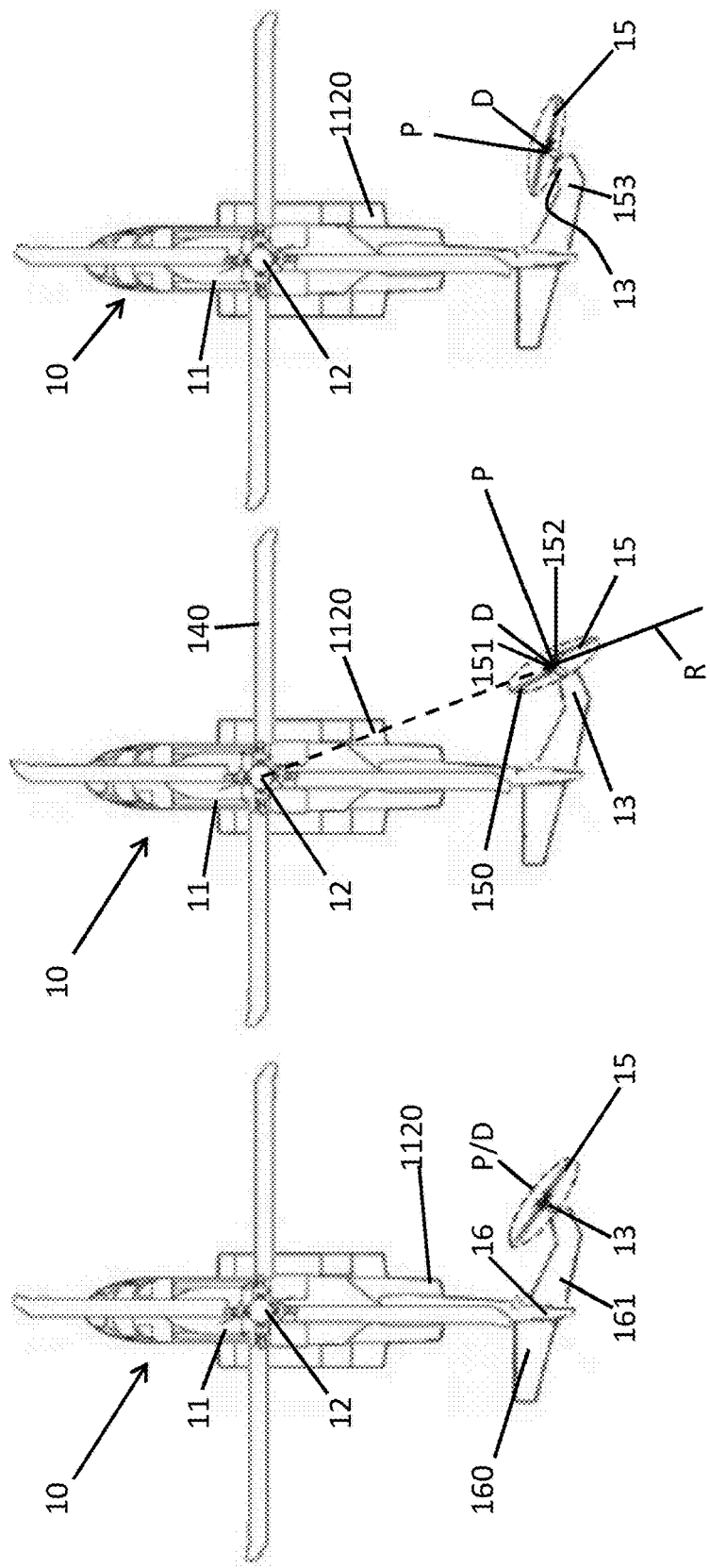

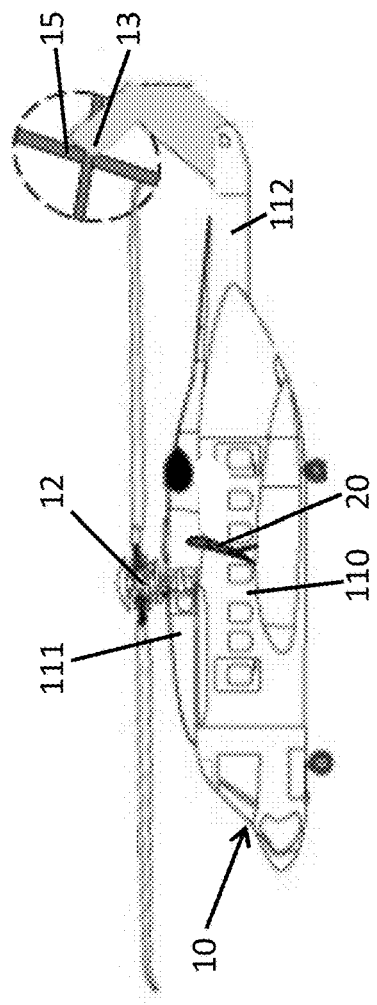
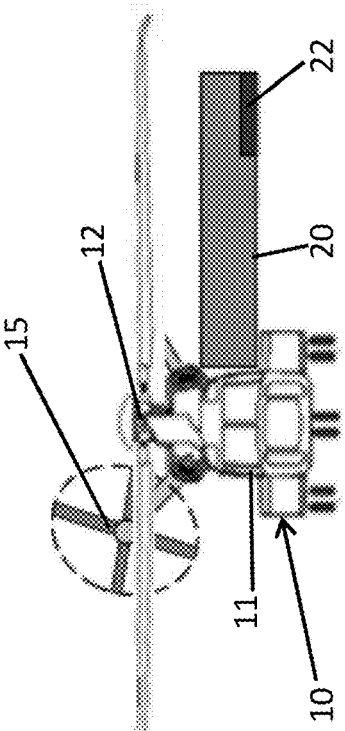
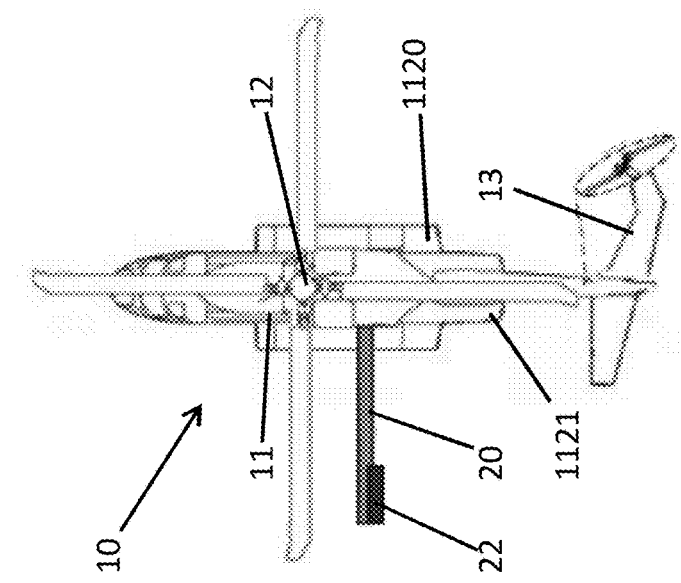

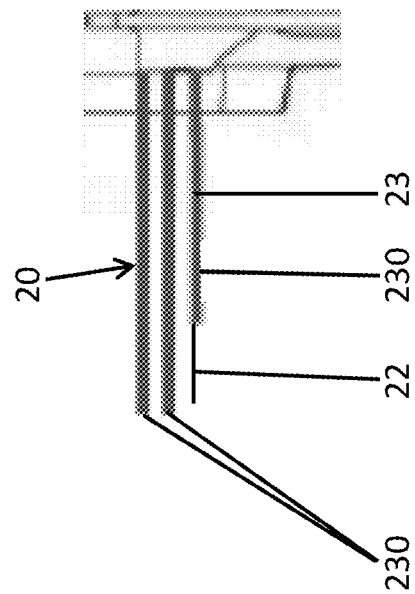
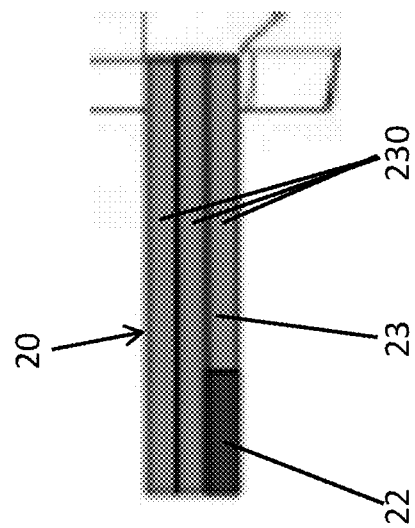

AIRCRAFT WITH THRUST VECTORING TAIL

CROSS-REFERENCE TO RELATED APPLICATIONS

This application claims benefit of priority of U.S. Provisional Application No. 62/159,635 filed on May 11, 2015, the disclosure of which is incorporated by reference.

BACKGROUND

The subject matter disclosed herein relates to an aircraft and, more particularly, to an asymmetric compound helicopter with a thrust vectoring tail.

A compound helicopter generally includes an airframe, a main rotor assembly, wings, and a one or more propellers. The airframe has a main section, an upper section and a tail section. The main section is formed to define a cockpit that can accommodate a pilot and in some cases one or more crewmen and/or passengers. The upper section is disposed at an upper portion of the main section and the tail section is disposed to extend in the aft direction from the main section. The main rotor assembly is disposed at the upper section of the airframe and may include an upper and lower coaxial, counter-rotating rotors. The propeller is disposed at the tail section.

The helicopter further includes a flight control computer, an engine and a transmission. The engine is configured to generate power that can be used to drive rotations of the main rotor assembly and the propeller in order to generate lift and thrust for the helicopter. The transmission transmits the power to the main rotor assembly and the propeller. The flight control computer controls various operations of the engine and the transmission as well as the collective and cyclic operations of the main rotor assembly and the propeller(s) in accordance with pilot inputted commands and current flight conditions.

As a result of the main rotor assembly including both an upper rotor and a lower rotor and other structure such as wings and multiple propellers, the overall weight of the main rotor assembly and the compound helicopter can be relatively high. This can lead to performance degradation, such as reduced fuel economy to transport a given payload weight to a destination.

BRIEF DESCRIPTION

According to one aspect, an aircraft is provided and includes an airframe, a main rotor assembly operably disposed on the airframe and one or more additional rotor assemblies operably disposed on the airframe and respectively including one or more articulated propellers with thrust vectoring capability that are each independently rotatable about a respective variable rotational axis.

In accordance with additional or alternative embodiments, blades of the one or more articulated propellers are cyclically and collectively controllable for adjustments of aircraft flight controls.

In accordance with additional or alternative embodiments, each of the one or more articulated propellers includes a hub with at least one of offset flapping hinges, a flexible prop-rotor and a teetering hub.

In accordance with additional or alternative embodiments, each of the one or more articulated propellers includes a variable speed controller.

In accordance with additional or alternative embodiments, each of the one or more articulated propellers is configured to assume at least one or more of a flat pitch mode, a tail rotor mode and a pusher-propeller mode.

According to another aspect, an aircraft is provided and includes an airframe having an upper section and a tail section, a main rotor assembly operably disposed at the upper section and including a main rotor that is rotatable about a rotational axis defined through the airframe, one or more tail rotor assemblies operably disposed on the tail section and respectively including one or more articulated propellers with thrust vectoring capability that are each independently rotatable about a respective variable rotational axis and one or more controllable wings extending outwardly from a side of the aircraft.

In accordance with additional or alternative embodiments, the main rotor includes a rigid main rotor.

In accordance with additional or alternative embodiments, blades of the one or more articulated propellers are cyclically and collectively controllable for at least micro-adjustments of aircraft flight controls.

In accordance with additional or alternative embodiments, each of the one or more articulated propellers includes a hub with at least one of offset flapping hinges, a flexible prop-rotor and a teetering hub.

In accordance with additional or alternative embodiments, a variable speed controller is coupled to the one or more articulated propellers.

In accordance with additional or alternative embodiments, the one or more controllable wings are pivotable about respective longitudinal axes thereof with one or more locking mechanisms to fix the respective angles of the controllable wings at specified angles.

In accordance with additional or alternative embodiments, each of the one or more controllable wings includes a single wing element.

In accordance with additional or alternative embodiments, the single wing element includes a trailing edge trim tab or aeleron.

In accordance with additional or alternative embodiments, each of the one or more controllable wings includes a slotted wing element.

In accordance with additional or alternative embodiments, the one or more articulated propellers are each configured to assume at least one or more of a flat pitch mode, a tail rotor mode and a pusher-propeller mode.

These and other advantages and features will become more apparent from the following description taken in conjunction with the drawings.

BRIEF DESCRIPTION OF THE DRAWINGS

The following subject matter is particularly pointed out and distinctly claimed in the claims at the conclusion of the specification. The foregoing and other features, and advantages are apparent from the following detailed description taken in conjunction with the accompanying drawings in which:

FIGS. 1A, 1B and 1C are top-down, side and front views of an aircraft in a flat pitch mode in accordance with embodiments;

FIGS. 2A, 2B and 2C are top-down, side and front views of an aircraft in a tail rotor mode in accordance with embodiments;

FIGS. 3A, 3B and 3C are top-down, side and front views of an aircraft in a pusher-propeller mode in accordance with embodiments;

FIGS. 4A, 4B and 4C are top-down, side and front views of an aircraft with a controllable wing in a hover mode in accordance with embodiments;

FIG. 6 is an enlarged view of the wing of FIGS. 5A, 5B and 5C in level flight mode in accordance with alternative embodiments; and FIG. 7 is an enlarged view of the wing of FIGS. 4A, 4B and 4C in hover mode in accordance with alternative embodiments.

Figure 1B:
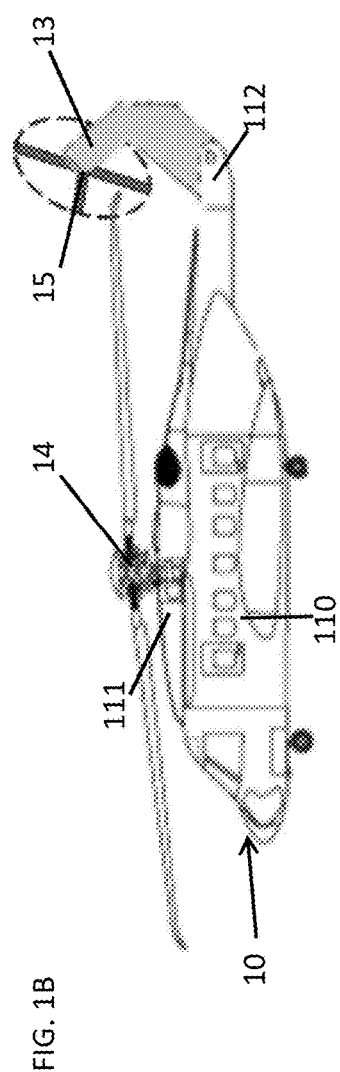

The detailed description explains embodiments, together with advantages and features, by way of example with reference to the drawings.

DETAILED DESCRIPTION

As will be described below, an aircraft is provided. The aircraft may be configured as a helicopter having a single main rotor with enhanced maneuverability and increased speed similar to that of a compound helicopter but with a light overall weight. The enhanced maneuverability and increased speed are drawn from a tail rotor assembly that includes an articulated propeller. This articulated propeller has thrust vectoring capability and the tip path plane is rotatable about a variable rotational axis in multiple flight modes by using cyclic control on the articulated propeller. The aircraft may further include a controllable wing that can be employed for additional flight control.

With reference to FIGS. 1A, 1B, 1C, 2A, 2B, 2C, 3A, 3B and 3C, an aircraft 10 is provided. The aircraft 10 includes an airframe 11, a main rotor assembly 12 and a tail rotor assembly 13. The airframe 11 has a main section 110, an upper section 111 and a tail section 112 (see FIGS. 1B, 2B and 3B). The main section 110 is formed to define a cockpit that can accommodate a pilot and in some cases one or more crewmen and/or passengers. The upper section 111 is disposed at an upper portion of the main section 110 and the tail section 112 is disposed to extend in the aft direction from the main section 110. The main rotor assembly 12 is operably disposed at the upper section 111 of the airframe 11 and includes a single, possibly rigid, main rotor 14 and a hub assembly that is rotatable about a rotational axis defined through the airframe 11. The tail rotor assembly 13 is operably disposed at the tail section 112 and includes one or more articulated propellers 15, each with thrust vectoring capability, and each being rotatable about a respective variable rotational axis.

Although it is to be understood that the aircraft 10 may include one or more articulated propellers 15 with varied tail configurations and locations where articulated propeller 15 is attached to the aircraft 10, the following description will generally relate to those embodiments in which the aircraft 10 includes only a single articulated propeller 15 attached to the tail where doing so will aid in clarity or brevity. Note that some examples of variations include, but are not limited to, configurations in which the one or more articulated propellers are attached to the aircraft in various locations on the tail section 112, configurations in which the tail section 112 is substantially integrated with the main section 110 or upper section 111 and configurations in which the tail section 112 and consequently tail rotor assembly 13 is located below the main rotor 14 (e.g. the tail rotor assembly being located in the downwash of the main rotor 14 while aircraft 10 is in a hover).

The aircraft 10 further includes a flight control computer, an engine and a transmission. The engine is configured to generate power that can be used to drive rotations of the main rotor 14 and the articulated propeller 15 in order to generate lift and thrust for the aircraft 10 and in order to provide for yaw control of the aircraft 10. The transmission transmits the generated power to the main rotor assembly 12 and the tail rotor assembly 13. The flight control computer controls various operations of the engine and the transmission as well as the collective and cyclic operations of individual blades 140 and 150 (see FIG. 2A) of the main rotor 14 and the articulated propeller 15, respectively, in accordance with pilot inputted commands and current flight conditions.

In greater detail, the tail section 112 may include a symmetric or an asymmetric boom 16 that has a forwardly and upwardly swept elevator control surface 160 and a rearwardly and upwardly swept control surface 161 (see FIG. 2A). The articulated propeller 15 includes an articulated hub 151, which is coupled to a distal end of the control surface 161 at a first side 1120 of the tail section 112. The blades 150 are attached to the articulated hub 151 by way of offset flapping hinges 152 although it is to be understood that the hinges 152 can be effectively supplemented with or replaced by a flexible prop-rotor construction that provides for an effective hinge offset or a teetering hub. These and other embodiments provide a variable rotational axis of articulated propeller 15 such that the articulated propeller 15 nominal tip path axis of rotation P may be controlled to rotate independently of the mechanical drive axis of rotation D.

In any case, with the construction described above, the cyclic and collective control of the blades 150 can be managed to thereby control the blades to flap/fly to a position such that the nominal articulated propeller 15 tip path axis of rotation P (see FIGS. 2A and 3A) is significantly different from the axis of rotation of the articulated hub mechanical drive axis of rotation D (see FIGS. 2A and 3A), which is fixed with respect to and extends from the distal end of the control surface 161. Note that at flat pitch or when only collective and not cyclic control is employed on the articulated propeller 15, the tip path axis of rotation P will be substantially coincident to the mechanical drive axis of rotation D. That is, where cyclic control of a pivoting of the blades 150 about their respective longitudinal axes is applied to the blades 150, the articulated propeller 15 will be urged to rotate, pivot, flex and/or teeter with respect to the control surface 161 while collective control of the blades 150 will result in increased or decreased thrust. Thus, when the cyclic and collective controls are applied together, the articulated propeller 15 can provide for vectored thrust for various flight modes of the aircraft 10.

Figure 1C:
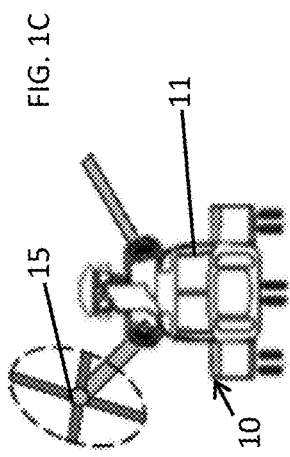
Figure 2B:
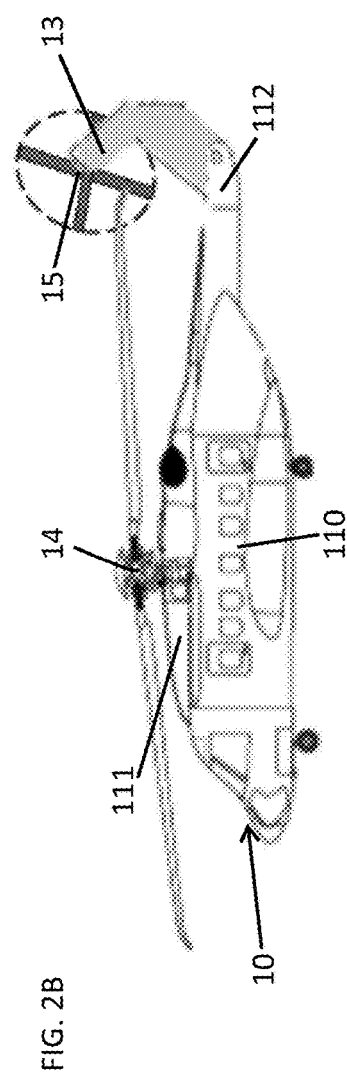
Figure 2C:
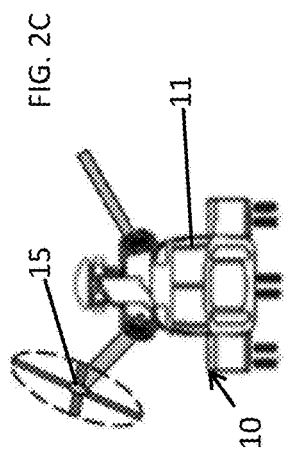
Figure 3B:
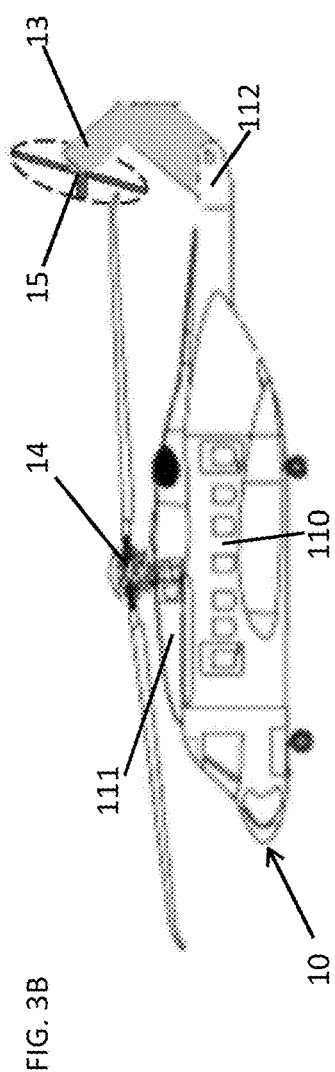
Figure 3C:
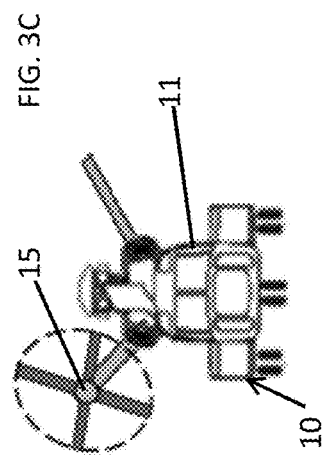

For example, as shown in FIGS. 1A, 1B and 1C, the aircraft 10 may assume a flat pitch mode in which the blades 150 are cyclically and collectively controlled to cause the articulated propeller 15 to be aligned with the mechanical drive axis of rotation D, which, in this embodiment, is canted upwardly and yawed toward a nose of the aircraft 10 when compared to a conventional helicopter. As another example, as shown in FIGS. 2A, 2B and 2C, the aircraft 10 may assume a tail rotor mode in which the blades 150 are cyclically and collectively controlled to cause the articulated propeller 15 to be canted relatively flatly or slightly to generate lift and yawed laterally to provide for anti-torque yaw control. Here a butt-line offset allows a line R normal to an articulated propeller 15 thrust vector in tail rotor mode to pass approximately through a main rotor 14 axis and articulated hub 151 axis such that there may not be a need for direction of articulated propeller 15 thrust completely aligning with the lateral axis for maximum anti-torque capability in hover. As yet another example, as shown in FIGS. 3A, 3B and 3C, the aircraft 10 may assume a pusher-propeller mode in which the blades 150 are cyclically and collectively controlled to cause the articulated propeller 15 to be canted relatively flatly or slightly to generate lift and yawed substantially forwardly to provide for forward thrust. In this case, a butt-line offset, cyclic control of the blades 150 and blade flapping allows for anti-torque control as well as directional control with increased degrees of freedom.

In accordance with further embodiments, the rotation, pivoting or teetering of the articulated propeller 15 with respect to the control surface 161 as a result of the cyclic and collective controls of the blades 150 can be exploited for both large aircraft flight control movements as well as micro-adjustments of aircraft flight control movements. For example, in a hover mode of the aircraft 10, the cyclic control of the blades 150 to achieve thrust vectoring on the articulated propeller 15 can provide for additional freedom in pitch and roll trim state, a larger available center of gravity envelope and the ability to effect fine horizontal translations with a lesser change in pitch and roll as compared to conventional helicopters. Additionally, in a forward flight mode of the aircraft 10, the cyclic control of the blades 150 to achieve thrust vectoring on the articulated propeller 15 can provide the ability to trim the aircraft pitch attitude to minimize aircraft drag for a wide range of cruise speeds and longitudinal centers of gravity. Additionally, in forward flight mode of the aircraft 10, the cyclic and collective control on the articulated propeller 15 may be used to provide varying lateral forces at a constant anti-torque value in forward flight and thus allows for fine lateral repositioning in forward flight to adjust the ground track of aircraft 10 with minimal change in aircraft attitude or heading when compared with conventional rotorcraft.

As an additional feature, the aircraft 10 may include a variable speed controller 153 (see FIG. 3A) and transmission for coupling with the articulated propeller 15. The variable speed controller 153 may be disposed within the control surface 161, the articulated hub 151 or other locations in the aircraft 10. The variable speed controller 153 provides for an allowance of more or less blade flapping and resultant thrust vectoring capability due to the centrifugal forces at the varying speeds.

With reference to FIGS. 4A, 4B, 4C, 5A, 5B, 5C, 6 and 7, the aircraft 10 may further include one or more controllable wings 20. As noted above, although it is to be understood that the aircraft 10 may include one or more controllable wings 20, the following description will generally relate to those embodiments in which the aircraft 10 includes only a single controllable wing 20 where doing so will aid in clarity or brevity.

Figure 5B:
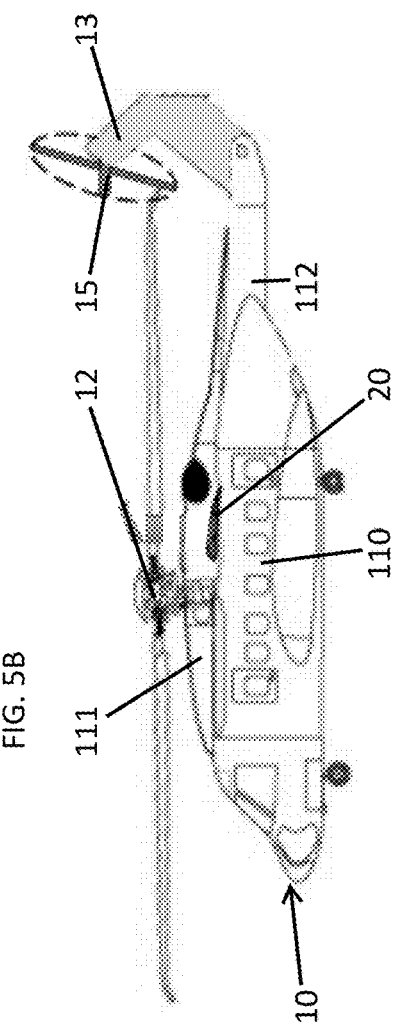
FIGS. 5A, 5B and 5C are top-down, side and front views of an aircraft with a controllable wing in a forward flight mode in accordance with embodiments.
Figure 5C:
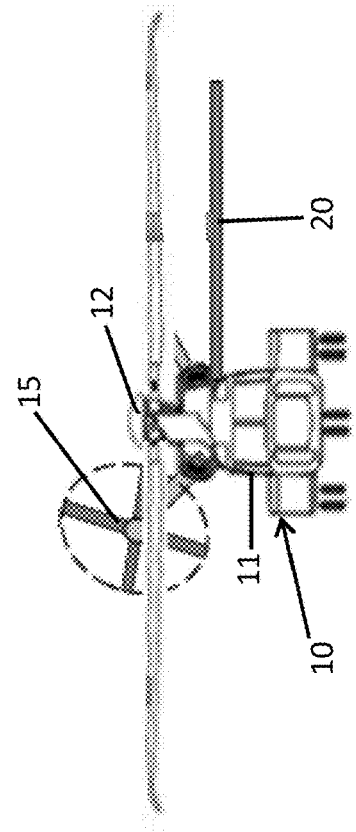
Figure 5A:
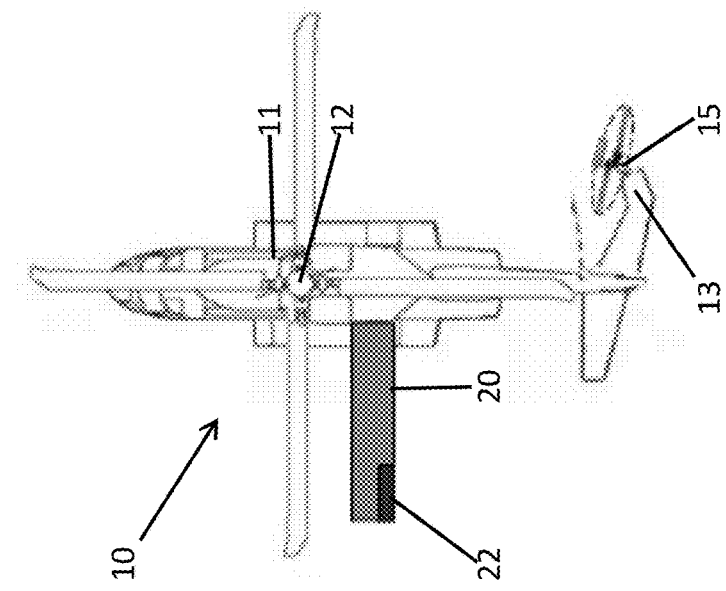

The controllable wing 20 extends outwardly from the retreating rotor blade side 1121 of the upper section 110 and provides for increased flight control capabilities. The controllable wing 20 is pivotable about a longitudinal axis thereof to assume varying angles of attack. For example, as shown in FIGS. 4A, 4B and 4C, the controllable wing 20 may be pivoted vertically to increase control of the aircraft 10 and decrease the vertical drag of the wing in a hover mode. Conversely, as shown in FIGS. 5A, 5B and 5C, the controllable wing 20 may be pivoted horizontally to decrease drag with the aircraft 10 in forward flight mode. The control of the controllable wing 20 may be actuated by mechanical means (not pictured) or by aerodynamic means via a trim tab 22 in cooperation with the main rotor 14 and tail rotor 15 and aerodynamic flow over the controllable wing 20. Additionally, the wing pivot angle may be locked at a specified angle with a locking mechanism (not shown).

In accordance with embodiments, the controllable wing 20 may include a segmented wing elements 230 (see FIGS. 6 and 7) and possibly the above-noted trailing trim tab 22 that can pivot with the segmented wing elements 230 independently from the controllable wing 20 such that vertical drag may be minimized in a hover. FIG. 6. shows the controllable wing 20 with segmented wing elements 230 configured for forward flight while FIG. 7. shows the controllable wing 20 with segmented wing elements 230 configured for hover. In such cases, the controllable wing 20 may have an airfoil-shaped cross-section with leading and trailing edges, a pressure surface and a suction surface when the segments are rotated such that the controllable wing 20 is configured for forward flight (see FIG. 6). In accordance with this embodiment, the controllable wing 20 may include a slotted wing element 23 (see FIG. 7) with multiple slotted wing elements 230. In such cases, each of the slotted wing elements 230 may have an airfoil-shaped cross-section with leading and trailing edges, a pressure surface and a suction surface.

While the description detail is in connection with only a limited number of embodiments, it should be readily understood that the description is not limited to such disclosed embodiments. Rather, modifications can be made to incorporate any number of variations, alterations, substitutions or equivalent arrangements not heretofore described, but which are commensurate with the spirit and scope herein. Additionally, while various embodiments have been described, it is to be understood that aspects may include only some of the described embodiments. Accordingly, the description is not to be seen as limited by the foregoing description, but is only limited by the scope of the appended claims.

What is claimed is:

1. An aircraft, comprising:
an airframe having an upper section and a tail section;
a main rotor assembly operably disposed at the upper section and including a main rotor that is rotatable about a rotational axis defined through the airframe;
one or more tail rotor assemblies operably disposed on the tail section and respectively including one or more articulated propellers with thrust vectoring capability that are each independently rotatable about a respective variable rotational axis; and
not more than one controllable wing extending outwardly from a side of the aircraft.

2. The aircraft according to claim 1, wherein the main rotor comprises a rigid main rotor system.

3. The aircraft according to claim 1, wherein blades of the one or more articulated propellers are cyclically and collectively controllable for adjustments of aircraft flight controls.

4. The aircraft according to claim 1, wherein each of the one or more articulated propellers comprises a hub with at least one of offset flapping hinges, a flexible prop-rotor and a teetering hub.

5. The aircraft according to claim 1, further comprising a variable speed controller coupled to the one or more articulated propellers.

6. The aircraft according to claim 1, wherein the controllable wing is pivotable about respective longitudinal axes thereof with one or more locking mechanisms to fix the angles of the controllable wings at specified angles.

7. The aircraft according to claim 1, wherein the controllable wing comprises at least one of a trailing edge trim tab and an aileron surface.

8. The aircraft according to claim 1, wherein the controllable wing comprises a segmented wing element.

9. The aircraft according to claim 1, wherein the one or more articulated propellers are each configured to assume at least one or more of a flat pitch mode, a tail rotor mode and a pusher-propeller mode.

* * * * *